(12) United States Patent
Johnson et al.

(10) Patent No.: US 7,809,991 B2
(45) Date of Patent: ***Oct. 5, 2010

(54) SYSTEM AND METHOD TO QUALIFY DATA CAPTURE

(75) Inventors: Tyler J. Johnson, Murphy, TX (US); Ryan Lee Akkerman, Allen, TX (US); John A. Benavides, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/033,226

(22) Filed: Jan. 11, 2005

(65) Prior Publication Data

US 2006/0156290 A1  Jul. 13, 2006

(51) Int. Cl.
*G06F 11/00* (2006.01)
(52) U.S. Cl. .......................................... 714/45; 714/47
(58) Field of Classification Search .................. 714/45, 714/47
See application file for complete search history.

(56) References Cited

U.S. PATENT DOCUMENTS

| | | | |
|---|---|---|---|
| 4,791,356 A | 12/1988 | Warren et al. | |
| 5,457,694 A | 10/1995 | Smith | |
| 5,650,734 A | 7/1997 | Chu et al. | |
| 5,778,251 A | 7/1998 | Kuroiwa et al. | |
| 5,825,199 A | 10/1998 | Shelton et al. | |
| 5,828,872 A | 10/1998 | Watkins | |
| 5,850,512 A | 12/1998 | Song | |
| 5,880,671 A | 3/1999 | Ranson et al. | |
| 5,881,224 A | 3/1999 | Ranson et al. | |
| 5,930,482 A * | 7/1999 | Carter et al. ................. | 710/100 |
| 5,949,251 A | 9/1999 | Chambers | |
| 5,956,476 A | 9/1999 | Ranson et al. | |
| 5,956,477 A | 9/1999 | Ranson et al. | |
| 6,003,107 A | 12/1999 | Ranson et al. | |
| 6,009,539 A | 12/1999 | Ranson | |
| 6,041,371 A | 3/2000 | Provence | |
| 6,377,912 B1 | 4/2002 | Sample et al. | |
| 6,389,558 B1 | 5/2002 | Herrmann et al. | |
| 6,397,354 B1 | 5/2002 | Ertekin | |
| 6,587,973 B1 * | 7/2003 | Tanaka ........................ | 714/54 |
| 6,618,775 B1 * | 9/2003 | Davis ......................... | 710/100 |
| 6,625,783 B2 | 9/2003 | Yamanaka | |
| 6,643,725 B1 | 11/2003 | Kozakai et al. | |
| 6,732,311 B1 | 5/2004 | Fischer et al. | |
| 6,754,852 B2 | 6/2004 | Swoboda | |
| 6,760,864 B2 * | 7/2004 | Wood et al. ................... | 714/30 |
| 6,769,049 B1 | 7/2004 | Bernard et al. | |

(Continued)

OTHER PUBLICATIONS

Agilent Technologies, "Triggering a Logic Analyzer on Complex Computer Buses", The International Engineering Consortium, (date unknown), pp. 1-17, http://www.iec.org.

(Continued)

*Primary Examiner*—Emerson C Puente (57) ABSTRACT

One disclosed embodiment may comprise a system that includes a qualification system that qualifies data on an associated bus for capture and provides a qualification signal as a function of at least one signal that describes a characteristic of the data on the associated bus. A data capture system stores qualified data from the associated bus based on the qualification signal and a trigger signal, the trigger signal defining a capture session.

27 Claims, 7 Drawing Sheets

U.S. PATENT DOCUMENTS

| | | | |
|---|---|---|---|
| 6,873,183 | B1 | 3/2005 | Kaviani et al. |
| 6,917,220 | B2 | 7/2005 | Saito |
| 6,944,731 | B2 | 9/2005 | Bouchard et al. |
| 7,007,205 | B1 * | 2/2006 | Yeager et al. ................. 714/45 |
| 7,061,272 | B2 | 6/2006 | Wilkes et al. |
| 7,159,083 | B2 | 1/2007 | Samuel et al. |
| 7,228,472 | B2 * | 6/2007 | Johnson et al. ............. 714/724 |
| 7,237,149 | B2 * | 6/2007 | Moyer et al. .................. 714/30 |
| 7,249,288 | B2 * | 7/2007 | Peled et al. ................... 714/47 |
| 7,348,799 | B2 * | 3/2008 | Benavides et al. ............ 326/46 |
| 2003/0126508 | A1 | 7/2003 | Litt |
| 2004/0124903 | A1 | 7/2004 | Chaudhari |
| 2004/0193962 | A1 | 9/2004 | Johnson et al. |
| 2004/0193976 | A1 | 9/2004 | Slaight et al. |
| 2004/0210782 | A1 | 10/2004 | Hsu |
| 2005/0086652 | A1 | 4/2005 | Tian et al. |
| 2005/0140390 | A1 | 6/2005 | Wilkes et al. |
| 2005/0166006 | A1 | 7/2005 | Talbot et al. |

OTHER PUBLICATIONS

HP E2910A PCI Exerciser, Technical Data Product Description and Specifications, pp. 1-18, Hewlett-Packard Company, Jul. 1996.

Emulation-Bus Analyzer with deep trace memory (HP64794), 1993 Hewlett-Packard Company, pp. 1-104.

http://www.merriam-webster.com/dictionary/trigger, p. 1, Jun. 5, 2008.

http://www.m-w.com/dictionary/signal, p. 1, Dec. 20, 2007.

Non-Final Office Action dated Mar. 21, 2007 for U.S. Appl. No. 11/032,949 in the United States.

Notice of Allowance dated Oct. 26, 2007 for U.S. Appl. No. 11/032,949 in the United States.

Non-Final Office Action dated Jun. 10, 2008 for U.S. Appl. No. 11/033,226 in the United States.

Final Office Action dated Oct. 29, 2008 for U.S. Appl. No. 11/033,226 in the United States.

Non-Final Office Action dated Mar. 19, 2009 for U.S. Appl. No. 11/033,226 in the United States.

Final Office Action dated Sep. 30, 2009 for U.S. Appl. No. 11/033,226 in the United States.

Notice of Allowance dated Mar. 23, 2007 for U.S. Appl. No. 11/032,928 in the United States.

Non-Final Office Action dated May 10, 2006 for U.S. Appl. No. 11/032,743 in the United States.

Final Office Action dated Oct. 17, 2006 for U.S. Appl. No. 11/032,743 in the United States.

Final Office Action dated Jan. 31, 2007 for U.S. Appl. No. 11/032,743 in the United States.

Examiner Interview dated Feb. 26, 2007 for U.S. Appl. No. 11/032,743 in the United States.

Advisory Action dated Apr. 3, 2007 for U.S. Appl. No. 11/032,743 in the United States.

Non-Final Office Action dated May 14, 2007 for U.S. Appl. No. 11/032,743 in the United States.

Final Office Action dated Oct. 18, 2007 for U.S. Appl. No. 11/032,743 in the United States.

Advisory Action dated Jan. 8, 2008 for U.S. Appl. No. 11/032,743 in the United States.

Pre-Brief Appeal Conference Decision dated Mar. 11, 2008 for U.S. Appl. No. 11/032,743 in the United States.

Examiner Interview dated Apr. 24, 2008 for U.S. Appl. No. 11/032,743 in the United States.

Non-Final Office Action dated Jun. 17, 2008 for U.S. Appl. No. 11/032,743 in the United States.

Final Office Action dated Nov. 19, 2008 for U.S. Appl. No. 11/032,743 in the United States.

Final Office Action dated Mar. 2, 2009 for U.S. Appl. No. 11/032,743 in the United States.

Advisory Action dated May 8, 2009 for U.S. Appl. No. 11/032,743 in the United States.

Notice of Allowance dated Jul. 7, 2009 for U.S. Appl. No. 11/032,743 in the United States.

Office Action, dated Oct. 27, 2009 U.S. Appl. No. 11/032,743, 26 pages.

* cited by examiner

SYSTEM AND METHOD TO QUALIFY DATA CAPTURE

CROSS REFERENCE TO RELATED APPLICATIONS

This application is related to the following patent applications entitled: "SYSTEM AND METHOD FOR DATA ANALYSIS" (application Ser. No. 11/032,743, U.S. Patent Publication No. 2006/0155516); "SYSTEM AND METHOD TO CONTROL DATA CAPTURE" (application Ser. No. 11/032,928, now U.S. Pat. No. 7,228,472); "SYSTEM AND METHOD FOR GENERATING A TRIGGER SIGNAL" (application Ser. No. 11/032,949, now U.S. Pat. No. 7,348,799), all of which were filed on Jan. 11, 2005, contemporaneously herewith and are incorporated herein by reference.

BACKGROUND

As higher levels of circuit integration are achieved on a single integrated circuit chip or a chipset, there tends to be an increased complexity associated with monitoring and analyzing internal operation of a chip or associated with internal operation of the chipset. One device that can assist some aspects of monitoring and analyzing operation is a logic analyzer. A logic analyzer can take any of several forms, ranging from a simple PC plug-in card to a sophisticated bench-top mainframe that accepts a variety of high-performance plug-in functions.

DETAILED DESCRIPTION

Figure 1:
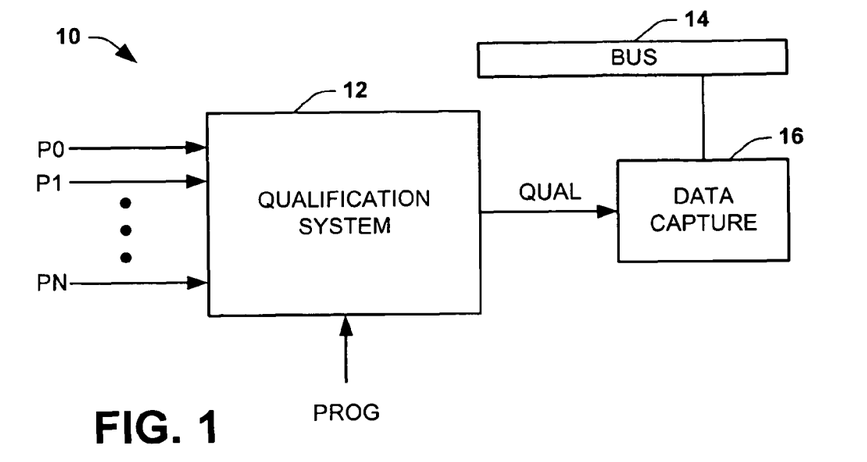
FIG. 1 depicts an embodiment of a system to qualify data capture.

FIG. 1 depicts an example of a system 10 that includes a qualification system 12 that is operative to qualify capturing of data from an associated data bus 14. As used herein, the terms "data" and "signal" or "signals" are used interchangeably to identify one or more bits of information. The system 10 can be implemented as part of an on-chip logic analyzer, which further can be part of an integrated circuit. The qualification system 10 qualifies capture of data from the bus 14 and provides a qualification signal (QUAL) as a function of one or more signals, indicated at P0, P1 through PN, where N is a positive integer denoting the number of one or more signals. Each of the signals P0, P1 through PN describes a characteristic of selected data on the associated bus 14, such as can be provided by a performance monitoring system.

As an example, the signals P0, P1 through PN can be provided each clock cycle as a function of selected portions of data on the bus 14 relative to one or more predefined performance conditions. The performance conditions can include arithmetic operations, logic operations, and matching operations, as well as combinations thereof relative to a subset of the data on the bus 14. The performance conditions can be applied to the data on the bus 14 every clock cycle or at some other predetermined rate. Each of the signals P0, P1 through PN can be provided as one or more bits having a value or state that indicates the results of each performance condition being monitored. A given one or more of the signals P0, P1 through PN can be asserted for each clock cycle that a given condition for a predetermined subset of some or all of the data on the bus 14 is met. When a given condition is met, the monitoring system can also increment a counter associated with the given condition to provide a cumulative indication of performance (e.g., over a plurality of clock cycles) for the respective performance condition(s) being monitored.

The data bus 14, for example, receives data from one or more sources in an integrated circuit chip or from anywhere in an associated device (e.g., a computer system) in which the system 10 is implemented. Those skilled in the art will understand and appreciate various approaches and feed structures that can be utilized to drive the bus 14 with data. The data bus 14, for example, can operate as a synchronous bus structure configured to propagate multi-bit data from one or more predetermined locations in an integrated circuit in which the system 10 is implemented. Additionally or alternatively, the data bus 14 can receive data from other integrated circuits that may be communicatively coupled with the bus 12, such as within a computer system, as well as from a combination of locations within the same integrated circuit or other circuitry communicatively coupled with the bus.

Examples of feed structures (e.g., interfaces) that can be employed to provide data to the bus 14 include bus interface modules. These and other feed structures can obtain data from within a computer system, such as from other bus structures (e.g., processor bus, PCI bus, etc.) or memory, and provide the data to the bus 14. In a multi-processor, multi-cell computer system, for example, the bus 14 can also include data from other circuit boards, such as provided through a crossbar structure. In such larger systems, a plurality of the systems 10 can be implemented through the computer system, including one or more of such systems on a single integrated circuit. The bus 14 thus may be referred to herein as an observability bus or a debug bus depending on the context of the system 10.

The qualification system 12 can be implemented as a general purpose matching and qualification circuit that operates to qualify the data capture events based on the function or functions being implemented relative to the signals P0, P1 through PN. The qualification system 12 can be programmed based on one or more program (PROG) signals to implement one or more predefined functions on the input signals. The qualification system 12, for example, can implement one or more arithmetic functions, one or more Boolean functions or a combination of arithmetic and Boolean functions relative to the signals P0, P1 through PN.

A data capture system 16 stores data from the associated bus based on the QUAL signal. Thus, if the qualification system 12 qualifies data in a given clock cycle, the data capture system can capture at least the qualified data. In one example, the qualification system 12 can be configured to qualify different portions of data on the bus 14 separately and provide the QUAL signal if any of the separate portions of the data meet a corresponding qualification condition implemented by the qualification system 12. The data capture system 16 can cause a complete set of data to be captured from the bus 14 based on QUAL signal (e.g., a single bit signal).

Alternatively, the data capture system 16 can cause a selected portion of the available data to be captured from the bus 14 based on QUAL signal (e.g., a multi-bit signal), such as when the qualification system 12 has qualified for storage only the selected portion of the data on the bus.

Figure 2:
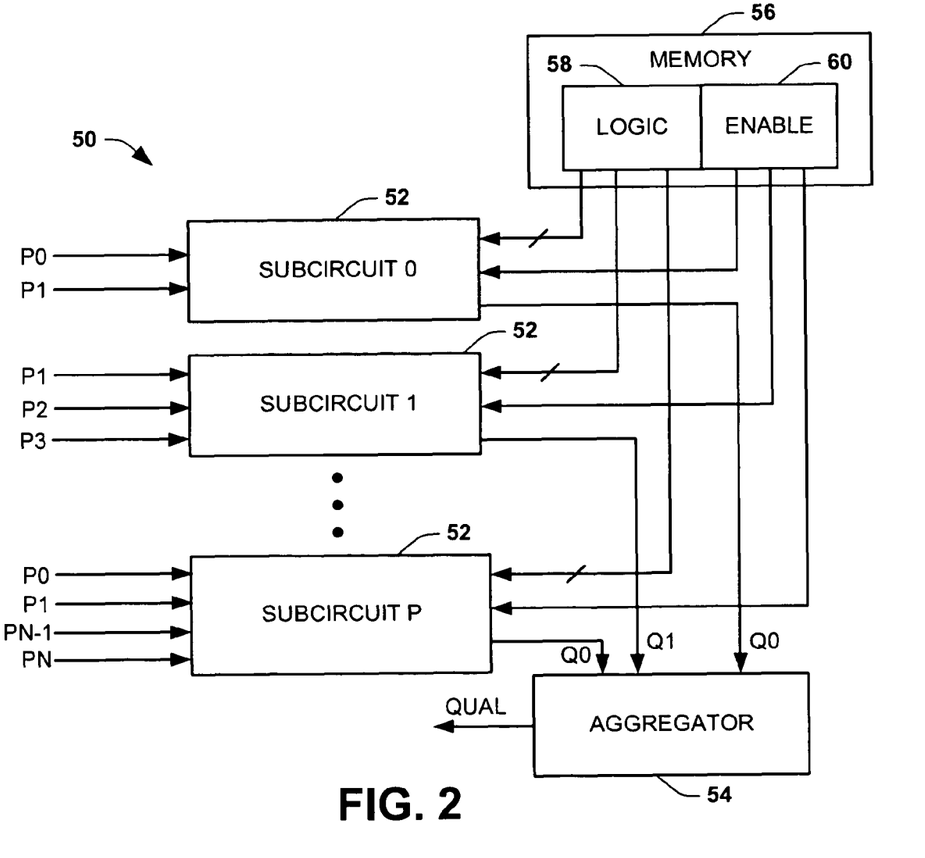
FIG. 2 depicts an embodiment of another system to qualify data capture.

FIG. 2 depicts an example of a qualification system 50 that includes a plurality of separate subcircuits 52. For example, the subcircuits 52 can be Boolean subcircuits: Boolean subcircuit 0, Boolean subcircuit 1 through Boolean subcircuit P, where P is a positive integer and P-1 denotes the number of subcircuits. Each of the subcircuits 52 is operative to provide a corresponding qualification signal, indicated at Q0, Q1 and QP, as a function of corresponding input signals, indicated generally at P0 through PN, where N-1 denotes the number of signals. P and N may be the same or different. The signals P0-PN can define variables for purposes of the Boolean operations performed by each of the subcircuits 52. As described herein, the input signals P0-PN to the qualification system 50 can represent values (e.g., one or more bits) of respective performance conditions for data on an associated bus.

It will be appreciated that one or more of the same signals P0-PN can be qualified by more than one of subcircuits 52 concurrently. This affords an increased set of possible Boolean operations that can be performed by the qualification system 50 over the set of variables corresponding to signals P0-PN. For example, since more than one of the signals (e.g., P0 and P1) are provided to different subcircuits, respective Boolean operations can be performed concurrently the signals and on the compliment (or inverse) of such signals. For those signals that occur only a single time as inputs to the qualification system 50, Boolean operations can be performed on either each of the signals or the compliment (or inverse) of the signals.

By way of example, each of subcircuits 52 can perform a corresponding Boolean operation by performing matching between predefined data and the variables defined by the input signals that are provided to the respective subcircuit. Thus, the qualification signals Q0, Q1 through QP vary as a function of the Boolean operation performed by each of the subcircuits on the respective variables. An aggregator 54 aggregates the qualification signals Q0, Q1 through QP to provide a corresponding aggregate qualification signal, indicated at QUAL. The QUAL signal can be a single bit or a multi-bit value that varies based on the respective qualification signals Q0, Q1 through QP.

Memory 56 can also be provided to set or configure the qualification system 50. For example, the memory 56 can be implemented as system addressable memory (e.g., an array of control and status registers). The memory 56 can be programmed to set logic data 58 that defines Boolean operations performed by the subcircuits 52 on the respective variables defined by the corresponding input signals P0-PN. As an example, the logic data 58 can correspond to a vector of logic values for masking the respective input signals provided to each of the subcircuits 52. The logic data 58 thus can be set to determine whether the values of the respective input signals match predetermined logic values, as stored as logic data in the memory 56.

The memory 56 can also include enable data 60 to selectively enable each of the plurality of subcircuits 52. The enable data 60 thus can be set for each of the subcircuits 52 to enable or disable the subcircuit to control whether a predetermined Boolean operation is performed relative to a selected subset of some or all of the input signals P0-PN. The Boolean operations implemented by the subcircuits 52 can be fixed for a data capture session by programming the logic data 58 and the enable data 60 for qualifying data capture over a plurality of cycles. Alternatively, the memory 56 can be reprogrammed during a capture session, such as to vary the Boolean functions performed by the subcircuits 52 over time. If the logic data 58 or the enable data 60 are to be reprogrammed during a capture session, the process should be configured to accommodate the time for re-programming the memory 56.

The memory 56 can be programmed, for example, by employing a system processor to address corresponding memory address locations associated with the logic data 58 or the enable data 60 that is to be programmed. Those skilled in the art will understand and appreciate other ways to program the memory 56, which can include but are not limited to configuration utilities (e.g., via a serial or JTAG interface communicatively coupled to the memory) or by other configuration tools or by scan-on-the-fly.

Figure 3:
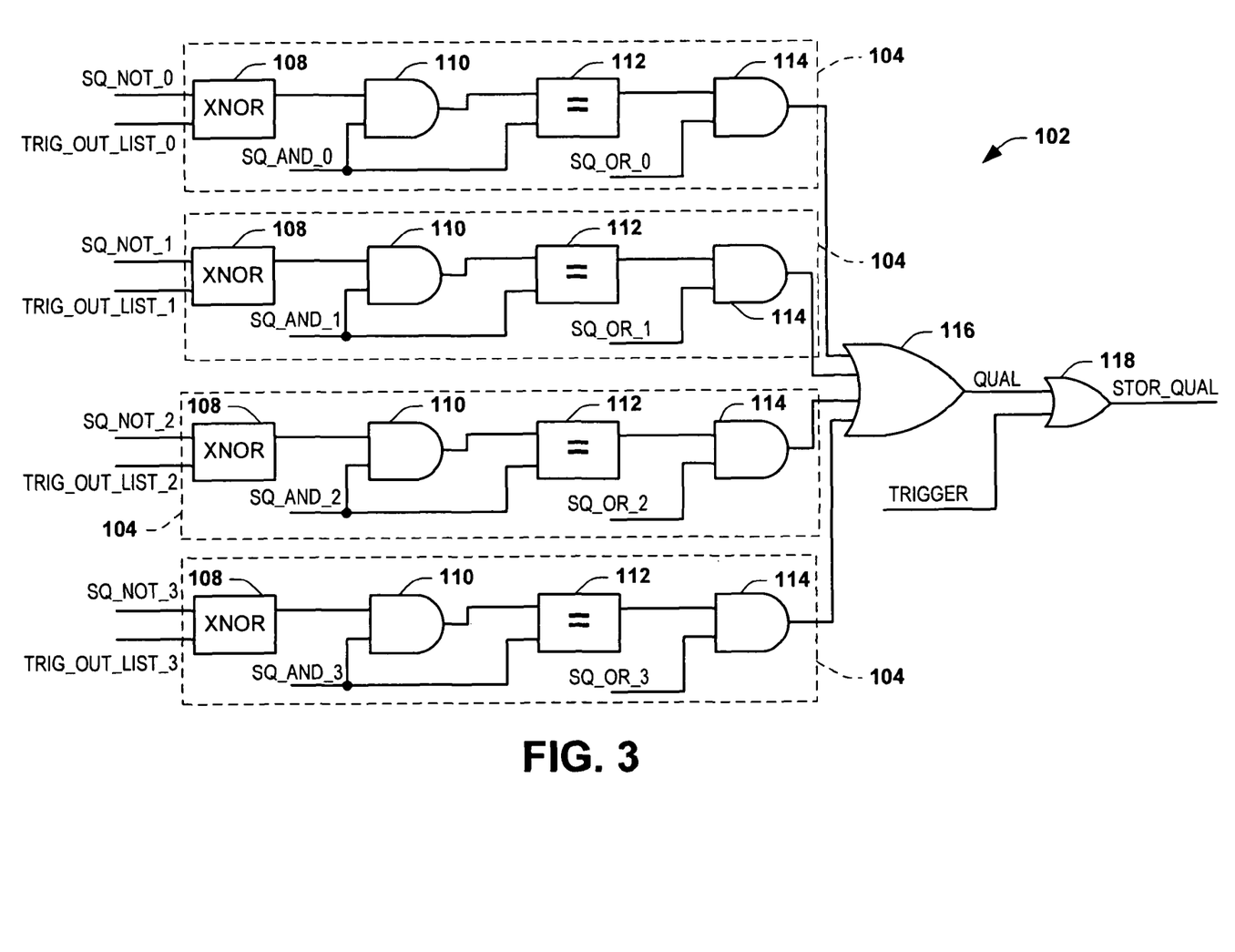
FIG. 3 depicts an embodiment of yet another system to qualify data capture.

FIG. 3 depicts an example of a store qualification system 102. The store qualification system 102 is programmed to qualify data capture by performing logic functions on a TRIG_OUT_LIST (e.g., from an associated monitoring system, as described herein). The qualification system 102 provides a QUAL signal based on the logic functions performed on the TRIG_OUT_LIST. The TRIG_OUT_LIST characterizes performance conditions associated with data on an associated bus, such as described herein. The QUAL signal is aggregated with a TRIGGER signal to provide a STOR_QUAL signal that controls the capture buffer to store data if a store qualification condition is met or if the logic analyzer triggers.

In the example of FIG. 3, four qualification functions 104 are performed relative to selected data from the TRIG_OUT_LIST. For instance, a first function 104 operates on a first set of performance data TRIG_OUT_LIST_0, another function operates on a second set of performance data TRIG_OUT_LIST_1, a third function operates on a third set of performance data TRIG_OUT_LIST_2 and a fourth function operates on performance data TRIG_OUT_LIST_3. It will be appreciated however, that the store qualification system 102 can include any number of one or more qualification functions 104 for generating the QUAL signal. Each of the TRIG_OUT_LIST_0, TRIG_OUT_LIST_1, TRIG_OUT_LIST_2 and TRIG_OUT_LIST_3 can include one or more bits of data from the TRIG_OUT_LIST. The bits of data can be different or include one or more common data bits from the TRIG_OUT_LIST. Each of the logic functions 104 can be programmable, such as by writing program data to corresponding system addressable memory. The program data defines the particular operations implemented by the qualification functions. The program data for each qualification function 104 can include can include SQ_NOT_X, SQ_AND_X, SQ_OR_X, where "X" denotes which logic function 104 the program data is associated.

In the example of FIG. 3, each of the functions 104 is depicted as including similar components, as indicated by using the same reference numbers. It will be appreciated that different components could also be utilized. In view of the similarities shown in the implementation of FIG. 3, a single one of the functions 104 will now be described. The function 104 includes a bit-wise inverter, which is represented as an XNOR gate 108, to perform a bit-wise inversion of the TRIG_OUT_LIST_0 data by performing an XNOR function relative to an input signal indicated at SQ_NOT_0. TRIG_OUT_LIST_0 and SQ_NOT_0 should have the same number of bits.

The XNOR gate 108 provides the inverted version of the TRIG_OUT_LIST_0 data to an input of an AND-gate 110, which is ANDed with a SQ_AND_0 input. The AND gate 110 provides a corresponding output to a bit-wise comparator 112. The AND gate 110 and comparator 112 perform a bit masking function relative to the inverted TRIG_OUT_LIST_0 data, such as to ascertain whether one or more values of the TRIG_OUT_LIST_0 data has a predetermined state, as provided by the SQ_AND_0 input. The SQ_AND_0 input can be programmable to implement any desired function (e.g., logic, arithmetic or a combination of logic and arithmetic) relative to the TRIG_OUT_LIST_0 data.

An AND-gate 114 performs an AND function with the comparator output and a SQ_OR_0 signal. The SQ_OR_0 signal can be programmed (e.g., by setting one or more bits of system addressable memory) to selectively enable or disable the corresponding output of the AND-gate 114 that is provided to a respective input of an OR-gate 116. The OR-gate 116 thus receives inputs from each of the respective logic functions 104 depending on whether their respective outputs are enabled (e.g., according to SQ_OR_0, SQ_OR_1, SQ_OR_2, and SQ_OR_3). The OR-gate 116 provides a predefined signal to another OR-gate 118 that aggregates the QUAL signal with the TRIGGER signal to generate the STOR_QUAL signal. The STOR_QUAL signal can be provided to control an associated capture buffer system, such as described herein.

Figure 4:
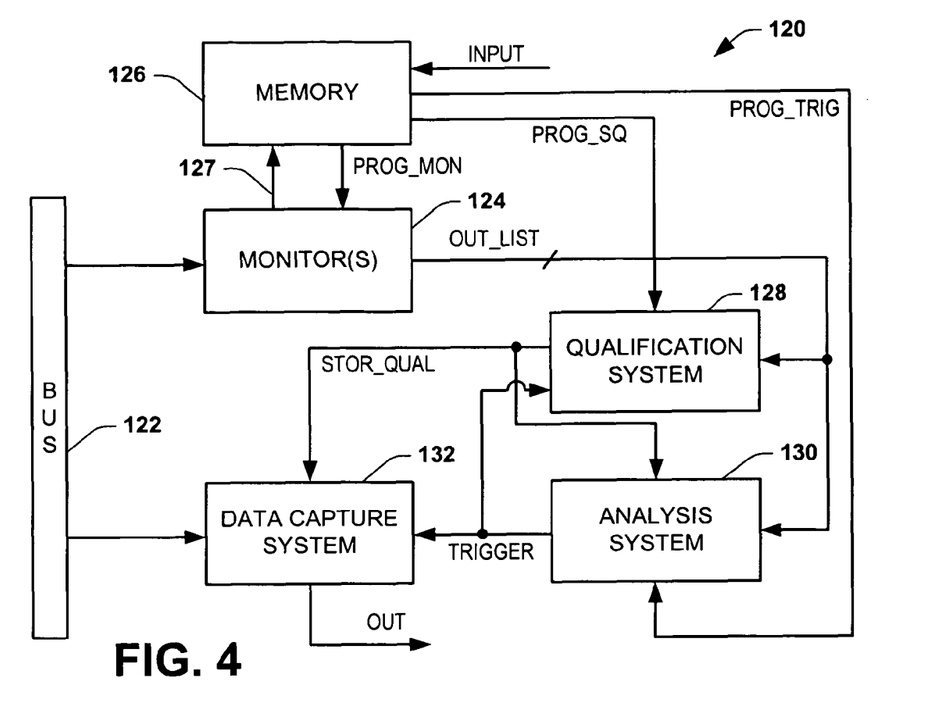
FIG. 4 depicts an embodiment of an integrated logic analysis system.

FIG. 4 depicts an example of a data acquisition system 120, such as may correspond to a logic analyzer. The system 120 is utilized to acquire data from a data bus 122. The data bus 122, for example, can receive data from one or more sources in an integrated circuit chip or from anywhere in an associated device in which the system 120 is implemented. Those skilled in the art will understand and appreciate various approaches and feed structures that can be utilized to drive the bus 122 with data. The data bus 122, for example, can operate as a synchronous bus structure configured to propagate multi-bit data from one or more predetermined locations in an integrated circuit in which the system 120 is implemented. In a multi-processor, multi-cell computer system, for example, the bus 122 can also receive data from other circuit boards, such as provided through a crossbar structure. In such larger systems, a plurality of the systems 120 can be implemented through the computer system, including multiple systems on a single integrated circuit.

A monitoring system 124 receives and monitors data provided on the bus 122. The monitoring system 124 can include a plurality of performance monitors/counters programmed and/or configured to determine whether certain performance conditions have been met based on the data propagated on the bus 122. For instance, the monitoring system 124 can be configured to implement arithmetic operations, logic operations, and matching operations, as well as combinations thereof relative to a subset of the data on the bus 122. The monitoring system 124 can provide a corresponding multi-bit output (OUT_LIST) that indicates the results of each performance condition being monitored. The monitoring system 124, for example, can assert a corresponding output bit in the OUT_LIST signal for each clock cycle that a given condition for a predetermined subset of some or all of the data bus 122 is met.

The performance conditions can be programmable and defined by writing to an associated memory (e.g., control and status registers) 126. The associated memory 126 can be one or more system addressable memory blocks within the computer system that is programmable by one or more program (INPUT) signals. The INPUT signals can be employed to set desired logic, matching and/or arithmetic operations that are to be performed by the monitoring system 124. The memory 126 can provide (or the monitoring system can read) PROG_MON signals to program the performance conditions for each performance condition monitored by the monitoring system 124. There can be a separate block of the memory 126 associated with programming each performance condition that the monitoring system 124 is to evaluate. For example, corresponding blocks in the memory 126 may be programmed by an internal processor (e.g., via system addressable memory) or from an external device or system utility by writing to predetermined address locations in the memory 126 that are assigned to respective performance monitoring circuits of the monitoring system 124.

The monitoring system 124 provides the OUT_LIST signals to a qualification system 128 and to an analysis system 130. The OUT_LIST signals can be provided as data over a multi-bit bus that includes a respective output for each performance condition that is monitored by the monitoring system 124. For example, when a particular condition being implemented by the monitoring system 124 is met, a corresponding bit (or bits) in the OUT_LIST signals can be asserted by the system 124 for a clock cycle. The assertion of the corresponding bit (or bits) in the OUT_LIST signals can correspond to incrementing a corresponding counter or other tracking circuitry in a respective performance monitoring circuit of the monitoring system 124. Thus, the multi-bit output OUT_LIST thus provides an indication as to whether certain conditions have been met in the data provided on the bus 122. Those skilled in the art will understand and appreciate that the monitoring system 124 can be programmed and configured to monitor any number of one or more conditions associated with the data on the bus 122.

The qualification logic 128 performs matching and qualification functions relative to the OUT_LIST data provided by the monitoring system 124. The qualification system 128 provides a STOR_QUAL signal to an associated data capture system 132 to identify whether data should be captured from the data bus 122. The qualification system 128, for example, can be programmed via a PROG_SQ signal, such as to perform qualification logic or matching functions on a selected group or subgroups of the OUT_LIST data relative to programmed data. The matching function, for example, can implement a matchable masking function that determines whether data should be captured from the data bus each clock cycle based on the results of the variables represented by the OUT_LIST signals. The matching function can thus provide the STOR_QUAL signal to identify one or more patterns associated with the results of the performance conditions being monitored by the monitoring system 124.

The analysis system 130 is configured to perform internal logic analysis relative to the performance monitor OUT_LIST data and provide one or more TRIGGER signals to control a capture session for acquiring data from the bus 122. For example, the analysis system 130 can be implemented as a state machine structure (e.g., Mealy or Moore) that transitions between states based on the performance conditions implemented by the monitoring system 124. As described herein, when the performance conditions are met, respective data in the OUT_LIST can be asserted for a clock cycle to enable logic analysis to be performed by the analysis system 130. The analysis system 130 can provide one or more TRIGGER signals to the data capture system 132 based on the OUT_LIST signals and the STOR_QUAL signal. The one or more TRIGGER signals can also be provided to the qualification logic block 128, as mentioned above.

The analysis system 130 can be configured (e.g., programmed via system addressable memory) with a vector (PROG_TRIG) that defines a set of possible state transitions associated with the analysis function being implemented. The analysis system 130 can also employ conditional branching for additional state transitions that vary based on the OUT_LIST data as well as based on the current state of the state machine implemented by the analysis system 130. The analysis system 130 thus can transition between states and among conditional branches associated with additional states based on the PROG_TRIG vector. The analysis system 130 can also control how the data capture system 132 captures data relative to a trigger event.

In a further example, the analysis system 130 can be programmed (e.g., via the PROG_TRIG signal) to adjust the timing of data capture relative to a trigger point, such as when the TRIGGER signal is asserted. For example, the PROG_TRIG signal can set one or more entries in system addressable memory (e.g., a register array or other memory) to set a trigger delay value that is utilized to define whether the capture buffer is to store data before the occurrence of a trigger event, after the occurrence of a trigger event or within some window that includes a trigger event. The window, for example, can vary based on the size of the buffer employed by the data capture system 132 or other memory utilized in conjunction with the buffers used to store the data from the bus 122.

Trigger events or conditions can occur when the analysis system transitions into one or more of the programmable states of the analysis system, which state(s) is designed to cause the TRIGGER signal to assert. For example, the state machine can include a FINAL STATE that causes the analysis system 130 to assert the trigger signal. Additionally, a predetermined number of one or more occurrences of a condition can be required before transitioning to a next state. For instance, a value can be programmed (e.g., via the PROG_TRIG signal) to set a number of occurrences for a given condition associated with one or more of the OUT_LIST data that must be met to enable a transition to a next state for the given condition. Programmable means can also exist to force the analysis to assert the TRIGGER signal.

The data capture system 132 is operative to store data from the bus 122 based at least in part on the STOR_QUAL signal from the qualification logic and based on the TRIGGER signal(s) provided by the analysis system 130. The data capture system 132 includes capture buffer control logic that can be set to define a quantity of data that is to be stored, a type of data that is to be stored and how data will be stored relative to the TRIGGER signal. For example, the control logic of the data capture system 132 can include an arrangement of hardware arranged to activate the data capture system 132 for storing a set of data from the bus 122 in response to the STOR_QUAL and TRIGGER signals. As a further example, the analysis system 130 can provide the TRIGGER signal corresponding to a trigger delay signal that identifies a value for a particular number of bits prior to or after the occurrence of a trigger condition that are to be stored in the data capture system 132. The data capture system 132 can provide its corresponding output signal (OUT) to associated memory, such as system addressable memory, which can be read by a system processor.

Those skilled in the art will appreciate various types of memory structures (e.g., register arrays, buffers, RAM, cache and the like) that can be utilized for inputting program data to various parts of the system 120 and for storing output OUT data from the system 120. Additionally, the system 120, including the monitoring system 124, the qualification system 128, the analysis system 130 and the data capture system 132 (or at least portions thereof) can be implemented as part of an application specific integrated circuit (ASIC). The ASIC can be implemented as an integrated logic analyzer internal to a computer system, a router, or other complex circuitry.

Figure 5:
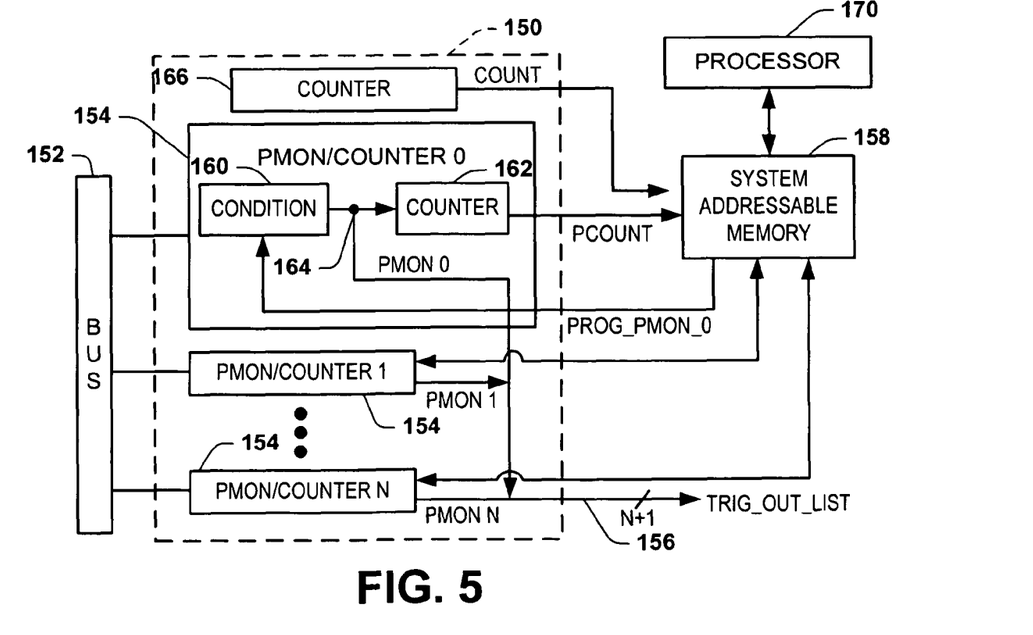
FIG. 5 depicts an embodiment of a monitoring system.

FIG. 5 depicts an example of a performance monitoring system 150 that can be utilized to monitor performance characteristics associated with data on a bus 152, such as an observability bus. The performance monitoring system 150 can be implemented as part of a logic analysis system implemented within a computer system. The performance monitoring system 150 includes a plurality of subsystems represented as performance monitor counters (PMON/COUNTER 0 and PMON/COUNTER 1 through PMON/COUNTER N) 154, where N is a positive integer and N+1 denotes the number of PMON/COUNTERS 154. The PMON/COUNTERS 154 collectively drive an output bus 156 corresponding to a multi-bit output signal indicated at TRIG_OUT_LIST. The output bus 156 thus can include N+1 bits, one bit associated with each of the PMON/COUNTERS 154.

Each of the PMON/COUNTERS 154 can be implemented as an arrangement of programmable logic, such as a programmable logic device (PLD), a field programmable gate array, other hardware, or as a combination of hardware and software. Each PMON/COUNTER 154 can be programmed to implement an operation or function for a selected portion or subrange of the data on the bus 152. For instance, each PMON/COUNTER 154 can implement a matching function relative to one or more selected bits from the bus 152. The PMON/COUNTERS 154 can also implement logic functions (e.g., invert, AND, OR, XOR, NOR, AND, XNOR and other logic functions and combinations of functions), arithmetic functions (e.g., addition, subtraction, multiplication, division, etc.), as well as combinations of logic and arithmetic functions on one or more bits on the bus 152.

System addressable memory 158 is operatively associated with each of the PMON/COUNTERS 154 to program a desired operation or function to be performed relative to data on the bus 152. The system addressable memory 158 can be accessed by a system processor 170 as well as by associated diagnostic utilities (not shown) or other devices that are capable of writing to the system addressable memory 158. The data in the system addressable memory 158 programs a particular operation or function that is performed by each of the respective PMON/COUNTERS 154.

In the example of FIG. 5, PMON/COUNTER 0 is depicted as including a condition block 160 and a counter 162. The condition block 160 implements a performance condition on one or more selected bits of data on the data bus 152, which condition can include performing an operation or function on the data, such as an arithmetic function, a logic function or a combination of logic and arithmetic functions. The particular logic and/or arithmetic function performed by the PMON/COUNTER 0 can be programmed according to a PROG_PMON_0 signal from the system addressable memory 158. The PROG_PMON_0 signal can also establish on which data from the bus 152 the performance condition is to be implemented, such as by identifying respective addresses for such data.

For example, the PROG_PMON_0 signal can include one or more bits that set the performance condition (e.g., logic function and/or arithmetic operation) that is performed on selected data from the bus 152. The condition block 160 provides a condition signal (PMON 0) 164 to the counter 162 based on application of the function or operation on the data. The condition block 160 can perform the performance condition every clock cycle or at other selected time intervals. When the performance condition is met, the condition block 160 asserts its output 164 (e.g., a logic HIGH for a clock cycle) corresponding to PMON 0, such as for one or more clock cycles. As an example, if the performance condition is met over a plurality of clock cycles, the condition block 160 may maintain PMON 0 in the asserted state over the plurality of clock cycles. Alternatively, the condition block 160 can toggle the PMON 0 output signal. The PMON 0 corresponds to part of the output bus 156 that forms the TRIG_OUT_LIST signals.

The output condition signal PMON 0 can also adjust a measure of performance associated with the data being monitored by the condition block. In the example of FIG. 5, PMON 0 monitored increments (or decrements) the counter 162 according to whether the performance condition implemented by the condition block 160 is met in a given clock cycle. The counter 162 provides a PCOUNT signal having a value indicative of the measure of performance monitored by the respective performance monitoring subsystem. For example, the PCOUNT signal can have a value indicative of the number of times the performance condition implemented by the condition block 160 is met, such as during a given capture session or over a plurality of sessions. The counter 162 can be reset, if needed.

For purposes of simplicity of explanation, the internal contents of the other PMON/COUNTER 1 through PMON/COUNTER N have been omitted from FIG. 5, although it will be understood that each can be similarly configured as shown and described with respect to PMON/COUNTER 0. That is, each PMON/COUNTER 154 can be programmed and/or configured to perform respective performance conditions that drive associated counters based on whether the conditions are met. Each time a counter is incremented (or decremented) based on a performance condition, a corresponding PMON output from the respective PMON/COUNTER 154 is also asserted in the TRIG_OUT_LIST signals on the bus 156 (e.g., for a clock cycle). Each of the N bits on the bus 156 associated with the TRIG_OUT_LIST signals thus provides an indication of performance associated with a selected part of the data on the bus 152 according to the performance conditions implemented by condition blocks in each of the PMON/COUNTERS 154. While the PMON/COUNTERS 154 have been described as being programmable, it is also contemplated that one or more of the PMON/COUNTERS 154 can be hardwired to implement fixed performance monitoring conditions.

The system 150 can also include another general counter 166 that increments a counter value to provide a COUNT signal with each clock cycle (or on some other periodic interval). The value of the counter 166 thus can be compared or evaluated relative to the PCOUNT signal from the counter 162 (as well as to counters of the other PMON/COUNTERS 154) to ascertain an indication of the frequency that the respective performance conditions implemented by the condition block 160 (and other condition blocks of the other PMON/COUNTERS 154) are met. For example, the processor 170 can employ the counter while executing instructions corresponding to a diagnostic utility.

Figure 6:
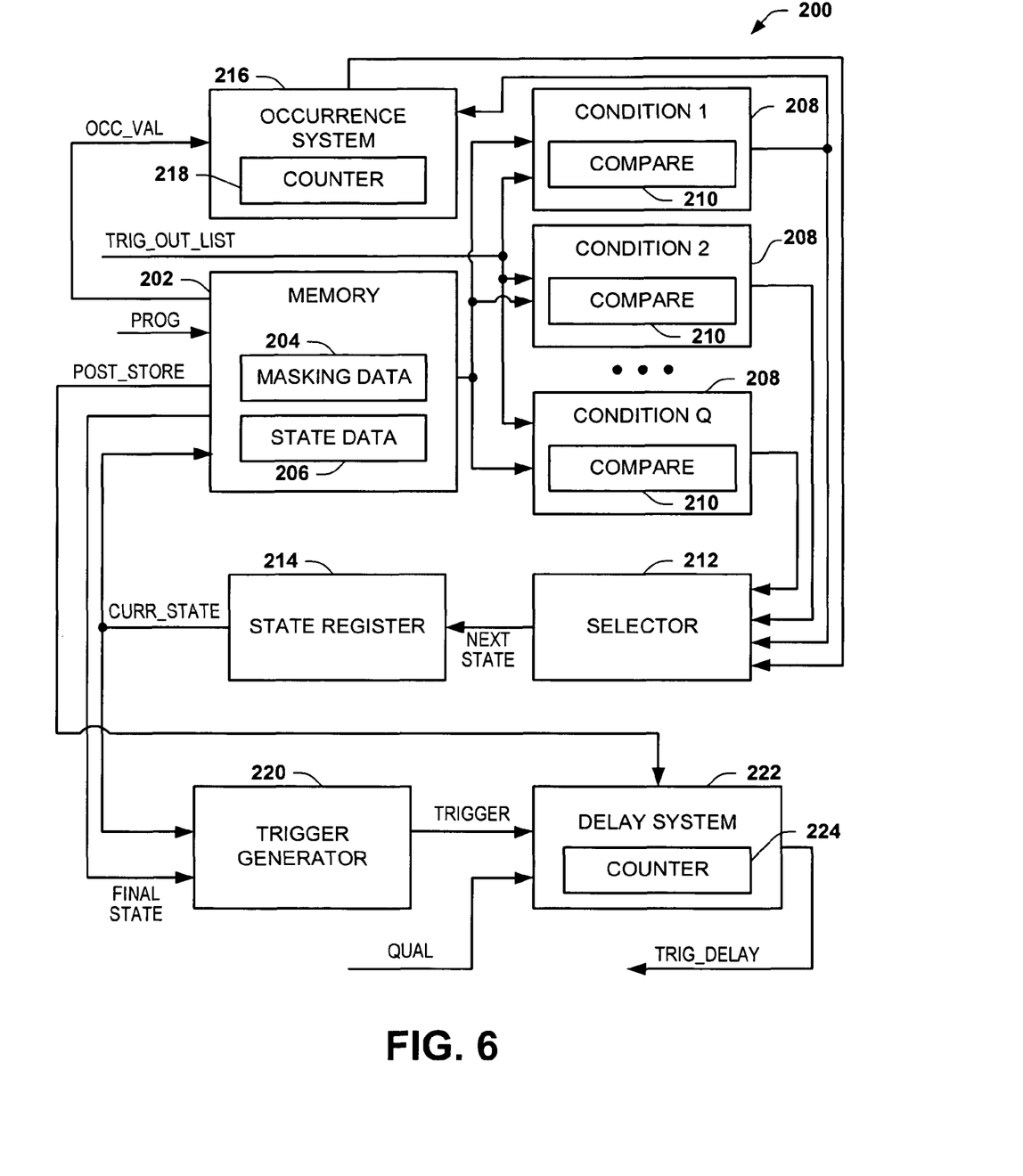
FIG. 6 depicts an embodiment of an analysis system.

FIG. 6 depicts an example of an analysis system 200 that can be utilized for logically analyzing data provided on a bus, such as a multi-bit synchronous observability or debug bus. The analysis system 200 employs a memory 202 that stores a vector, which can include masking data 204 that defines one or more conditions for implementing a state machine. The memory 202 can also include state data 206 that defines states and transitions among the available states. For example, the memory 202 can be any type of system addressable memory (e.g., a register array, such as a control and status register) that can be written to, such as from a system processor of a computer system in which the analysis system 200 is implemented. The memory 202 can also be read from to drive state transitions based on the TRIG_OUT_LIST.

The analysis systems 200 implements a state machine that transitions among a plurality of available states based on the TRIG_OUT_LIST, which describes performance characteristics of the data on the bus. Those skilled in the art will understand and appreciate various ways in which the analysis system 200 can be implemented to analyze the performance information provided in the TRIG_OUT_LIST signals. The analysis system 200 can include one or more condition components 208 that control state transitions for the state machine from a current state (CURR STATE) to a NEXT STATE. The CURR_STATE can include one or more bits (e.g., a three bit value) that determine how data propagated on the bus (e.g., the debug bus) will be analyzed and captured. The sequence of possible states, transitions between states, and functions perform by each condition component 208 can be programmed as a state transition vector in the memory 202 defined by the masking data 204 and the state data 206.

In the example of FIG. 6, the condition components are represented as CONDITION 1, CONDITION 2 and CONDITION Q, where Q is a positive integer (Q≧1) denoting a number of conditional branches and functions that can be implemented for each state. Those skilled in the art will understand and appreciate various types of conditions and other numbers of condition components 208 can be utilized in the analysis system 200. The condition components 208, for example, correspond to conditional logic and conditional branches performed on the TRIG_OUT_LIST to control state transitions for the state machine. The condition components 208 employ compare blocks (e.g., comparator circuitry) 210 to implement their respective functions on the TRIG_OUT_LIST according to masking data 204 read from the memory 202.

As an example, the compare block 210 for each condition component 208 can implement bit-wise masking (or matching) relative to the performance condition data represented by the TRIG_OUT_LIST. The compare blocks 210 thus can implement matching each cycle based on a masking vector stored as the masking data 204. The vector in the masking data 204 can be different for each compare block 210. The masking data 204 further can be fixed for a given capture session or the masking data can vary over a capture session, such as by employing different masking vectors for some or all of the available states. When a masking vector for a given condition component 208 matches the TRIG_OUT_LIST, the condition component provides a corresponding output to a selector 212 indicating that the condition has been met (e.g., the vector is enabled).

Each of the condition components 208 provides an output to the selector 212. The selector 212 is operative to identify the NEXT STATE for the state machine based on the outputs from the conditions components 208. The condition components 208 can be employed as hierarchical elements that control state transitions. For example, the condition components 208 can function as a priority encoder that implements state transitions based on the CURR STATE and based on the TRIG_OUT_LIST. As a priority encoder, the selector 212 can set the NEXT STATE based on which of the condition components is enabled next state data 206 according to the priority assigned to the respective condition components 208. Accordingly, the condition components 208 may operate as separate conditional branches that can be employed to implement predefined state transitions (e.g., preprogrammed as the state data 206) for the state machine based on the comparing the TRIG_OUT_LIST relative to the corresponding masking data 204 associated with each condition branch.

By way of further example, the following TABLE I provides a truth table representation of possible state transitions that can be implemented by the condition components 208 according to the results of the comparisons performed by the respective compare blocks 210. The entries in TABLE I, for example, correspond to the outputs of the three condition components 208 shown in FIG. 6. For instance, CONDITION 1 corresponds to a first or highest priority condition (e.g., an "if" condition), CONDITION 2 corresponds to a next highest priority condition (e.g., an "else if" condition) and CONDITION Q corresponds to a lowest priority condition (e.g., another "else if" condition). The values of the outputs for each of the respective condition components 208 thus indicates whether the respective vectors (stored in the masking data 204) are enabled (denoted by a logic "1") or are disabled (denoted by a logic "0"), such as by the compare blocks 210 comparing the TRIG_OUT_LIST with corresponding masking data 204. In TABLE I, the letter "X" denotes a "don't care" state associated with the respective outputs of condition components 208. When none of the conditions are met (e.g., all conditions equal 0), the selector 212 maintains its current state. Those skilled in the art will understand and appreciate various ways in which the functionality similar to that demonstrated in TABLE I can be realized to implement a state machine within a computer system, including hardware and/or software, based on the teachings contained herein.

TABLE I

| COND 1 | COND 2 | COND Q | RESULT |
|---|---|---|---|
| 0 | 0 | 0 | Load CURR_STATE |
| 0 | 0 | 1 | Load CONDITION Q NEXT STATE |
| 0 | 1 | X | Load CONDITION 2 NEXT STATE |
| 1 | X | X | Load CONDITION 1 NEXT STATE |

The selector 212 provides the next state information to a state register 214. The state register 214 thus provides an indication of the current state as the CURR STATE signal. As mentioned above, the CURR STATE can be employed to select a next available state from the state data 206 as well as (optionally) redefine the masking vector to be applied be each of the condition components 208 for the current state.

The system 200 can also include an occurrence system 216 that is operative to require multiple hits or occurrences by one or more given condition components (e.g., CONDITION 1) 208 before enabling the selector 212 to transition to a next state for the given condition component. For purposes of explanation, the example of FIG. 6 assumes that the occurrence system 216 applies only to the CONDITION 1, although other occurrence requirements can also be utilized in conjunction with other conditional branches of the analysis system 200. The occurrence system 216 thus provides an occurrence enable signal to the selector 212 indicating whether the predefined number of occurrences has been met for the given condition component (e.g., CONDITION 1) 208. The selector 212 thus can select the next state assigned to CONDITION 1 only if, for example, the occurrence enable signal indicates the number of occurrences has been met.

As an example, the occurrence system 216 includes a counter 218 that is operative to count occurrences when the compare block 210 for CONDITION 1 indicates that the corresponding masking vector is met for the CURR STATE. The memory 202 can provide an occurrence value (OCC_VAL) to the occurrence system 216. The value of OCC_VAL defines a number of one or more occurrences that are required before the masking data vector associated with CONDITION 1 can enable the selector 212 to load the next state vector associated with CONDITION 1. The same or different occurrence values can be programmed for different states of the state machine. The occurrence system 216 compares OCC_VAL relative to the value provided by the counter 218 and provides the occurrence enable signal to the selector 212 based on the comparison. The occurrence enable signal masks off the next state vector associated with CONDITION 1 until the OCC_VAL is met by the output of the counter 218. Accordingly, until the occurrence requirements associated with the CONDITION 1 have been met, the next state of the state machine will correspond to one of the next state vectors associated with one of the other condition components 208.

The analysis system 200 also includes a trigger generator 220. The trigger generator 220 is operative to generate the TRIGGER signal based on the CURR STATE relative to a predefined FINAL STATE, which can be stored in the memory 202. The trigger generator 220 can also include additional logic to force the trigger generator to provide the TRIGGER signal. Those skilled in the art will understand and appreciate various ways in which a TRIGGER signal can be generated, such as based on desired performance characteristics and design requirements.

The system 200 also includes a delay system 222 that is operative to generate the TRIG_DELAY signal based on the TRIGGER signal and the STOR_QUAL signal. As an example, the trigger delay generator 263 includes logic that ANDs the TRIGGER signal with an inverted version of the TRIG_DELAY signal and the STOR_QUAL signal. A counter 224 is enabled based on the output of the logic so as to increment its value provided that the TRIG_DELAY signal is not asserted and both the STOR_QUAL and TRIGGER signals are asserted (e.g., corresponding to qualified trigger events).

The delay system 222 compares the output of the counter 224 relative to a predefined counter value, indicated at POST_STORE. The POST_STORE value can be a predefined value that is read from corresponding system addressable memory 202 for implementing a desired trigger delay. The POST_STORE value can be programmed, such as for a given capture session, to define a trigger delay value that sets a data capture point relative to a corresponding trigger event (e.g., when the TRIGGER signal is asserted).

For example, a corresponding data capture system can capture a set of data that can be stored in a capture buffer prior to a trigger event based on a minimum POST_STORE value (e.g., POST_STORE=0). In such a scenario, the data capture system would turn off and stop storing data from the bus at a trigger event. Alternatively, the POST_STORE value can set the trigger delay to cause the data capture system to store all data after a trigger event based on a maximum POST_STORE value corresponding to the size of the capture buffer. In this latter scenario, the capture buffer would fill the capture buffer with data from the bus beginning after a trigger event. Depending on the size of the counter 224, a POST_STORE value may also be set to store future data, such as by reading data from the data capture system and storing the data in memory over a plurality of cycles after the trigger event. Another alternative is to store a set of data based on the POST_STORE value in a capture window (or windows) that resides within any one or more of the preceding data capture scenarios. The TRIG_DELAY signal thus can be provided to the data capture system along with the STOR_QUAL signal for controlling operation of the data capture system, such as described herein.

Figure 7:
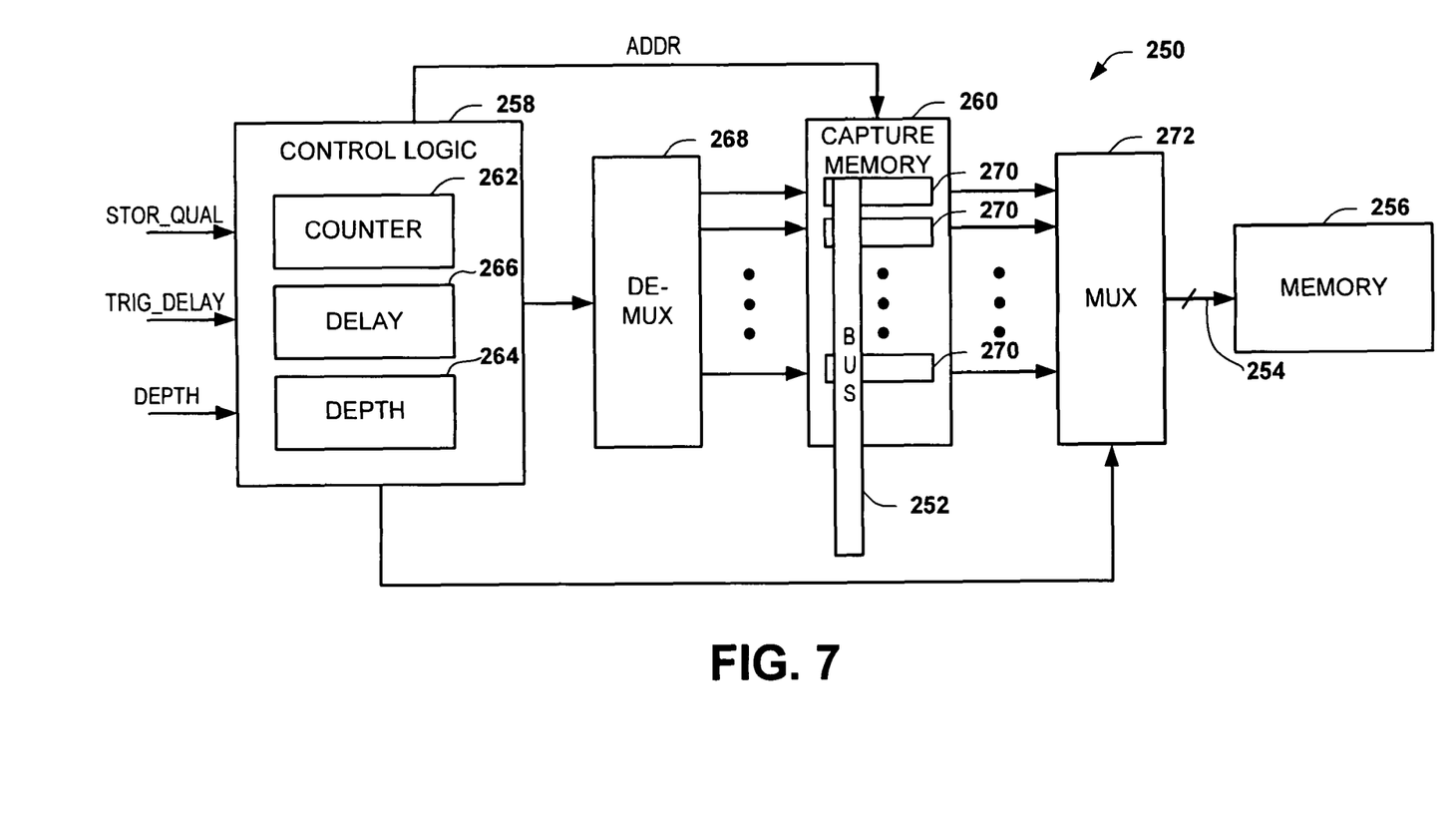
FIG. 7 depicts an embodiment of a data capture system.

FIG. 7 depicts an example of a data capture system 250 that can be utilized for storing data from a data bus (e.g., an observability or debug bus) 252. The data on the bus 252 may be logically partitioned to facilitate storing different parts of the data. For the example of an 80-bit debug bus 252, one portion of bus can include bits [39:0] and another portion of the bus can include bits [79:40]. Each of the bus portions can include any number of bits and that the bus can be separated into any component parts which can contain the same or different numbers of bits.

The data capture system 250 provides corresponding output data (e.g., a single or multi-bit data stream) 254 from the bus 252, which can be provided to an addressable memory field of associated memory 256. The memory 256 can be implemented as system addressable memory, such as a register array, or some other type of system memory in a computer system in which the data capture system 250 is being implemented. The data in the memory 256 can also be read from and stored in a non-volatile storage device (not shown), such as FLASH memory, EEPROM or a hard disk drive to name a few. The data capture system 250 provides the output data 254 based at least in part on a TRIG_DELAY signal (defining how data is captured relative to a trigger event) and the STOR_QUAL signal.

The data capture system 250 includes control logic 258 that is operative to control associated capture memory 260 for capturing or reading data from the bus 252. The control logic 258, for example, can include an arrangement of gates and other circuitry operative to capture data from the bus 252.

By way of example, the control logic 258 can include a counter 262 operative to control which data is read from the bus 252 and is written to the capture memory 260. The counter 262, for example, can be implemented as a multi-bit counter (e.g., an 11 bit counter) that maintains a count value that controls what data is to be captured from the data bus 252. Different portions of the multi-bit counter 262 can be employed for controlling different aspects of the system 250. For example, a set of bits (e.g., least significant bits) from the counter 260 can define an address of selected data on the bus 252 that are to be captured by memory modules (e.g., buffers) 270 in the capture memory 260. The control logic 258 thus can provide an address (ADDR) signal to the capture memory 260 that defines a corresponding address for data to be captured from the portion of the bus 252 associated with the memory modules 270.

Another set of bits from the counter 262 can be provided to a de-multiplexer (DE-MUX) 268 that provides a set of output signals based on the set of counter bits from the control logic 258. The de-multiplexer 268 is operative to drive a corresponding portion of the capture memory 260 for storing selected data from the data bus 252 in associated memory modules 270. For instance, the de-multiplexer 268 provides an enable signal to one or more of the memory modules 270 based on the control input from the control logic 258, corresponding to one or more bits (e.g., a portion of the most significant bits) from the counter 262 for selectively enabling the memory modules. As the counter 262 increments, the de-multiplexer 268 will enable each of the memory modules 270 in a corresponding sequence. The enabled memory module 270 is activated to read data from the bus 252 and to store such data in the memory module based on the address (ADDR) input. As mentioned above, the counter 260 can provide the ADDR input, such as corresponding to a set of least significant bits sufficient to encode the amount of data being propagated over the of the bus 252.

The memory modules 270 provide corresponding multi-bit inputs to output multiplexer (MUX) 272. The multiplexer 272 can also be controlled based on a control signal from the control logic, such as corresponding to some of the counter data corresponding to one or more bits (e.g., a portion of the most significant bits) from the counter 262. The control logic 258 can provide the same or different control signals to multiplexer 272 and the de-multiplexer 268. The multiplexer 272 provides the output data signal 254 according to which of the memory modules 270 is enabled during a given clock cycle. The output data signal 254 thus can be written to system addressable memory 256 and accessed via an associated processor for further analysis or for implementing other functions (e.g., fault control) within the computer system.

A depth control block 264 can be programmed via a DEPTH signal (e.g., stored in associated system addressable memory) to control the capture depth. The capture depth, for example, can set from which portion of the bus 260 data is to be stored for each qualified store event. For instance, in an 80 bit bus, the capture depth can set how many (and possibly which) of the 80 bits are to be captured for each qualified store event. By programming the DEPTH signal to one value, the data capture system 250 can be selectively configured to operate in a first mode that stores less data, but at a deeper level on the bus by capturing data from a larger portion of the bus (e.g., the entire bus) 252. In a second mode, the data capture system 250 can store more samples of data in the memory 256, but for a smaller portion (e.g., one-half) of the bus 252. The amount of data that is stored generally will vary depending on the size of the memory 256 relative to the capture depth. Those skilled in the art will understand and appreciate that other capture depths can be implemented by the depth control block 264.

The control logic 258 can also include a delay block 266 that controls when data is to be captured relative to a trigger delay (TRIG_DELAY) signal. For example, the control logic 258 receives the TRIG_DELAY signal from an associated delay system (e.g., the delay system 222 of FIG. 6). The TRIG_DELAY signal can be a single bit value that identifies when a predetermined number of store events (e.g., based on the STOR_QUAL signal) have occurred relative to a trigger signal asserting. The TRIG_DELAY signal alternatively could be a multi-bit signal. The associated delay system thus provides the TRIG_DELAY signal to control a window of data that is to be stored relative to a trigger event, such as described above with respect to FIG. 6. For example, the associated delay system can be programmed to implement a plurality of data stores from the bus 252 before a trigger event, after a trigger event or a window of stores that overlap with a trigger event. As mentioned above, a trigger event can occur in response to a trigger state machine entering a final state, such as in response to data propagated on the bus 252 meeting one or more conditions. Thus, the data capture system 250 is operative to continue capturing and storing data from the data bus 252 in response to the STOR_QUAL signal so long as the TRIG_DELAY signal does not assert. When the TRIG_DELAY signal asserts, for example, the control logic 258 can control the system 250 to turn off and stop storing data from the bus 252, effectively ending a capture session.

Figure 8:
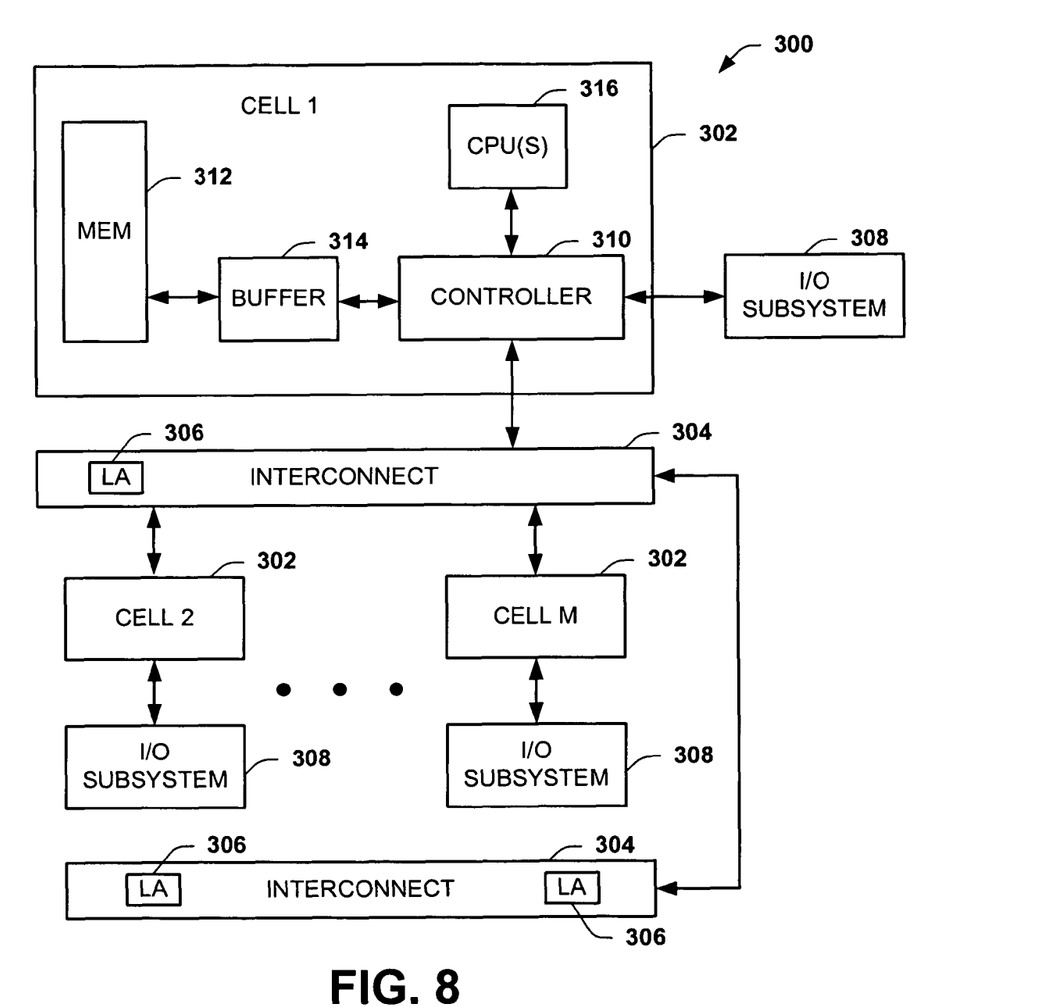
FIG. 8 depicts an example of a computer system that can implement one or more embodiments of a logic analysis system.

FIG. 8 depicts a block diagram illustrating an example of a computer system 300, which can implement one or more logic analyzer systems, such as shown and described herein (e.g., FIGS. 1-7). The computer system 300 of FIG. 8 is depicted as a distributed-memory multi-processor system, although a single processor system can also utilize the logic analyzer. The system 300 includes a plurality of cells 302 indicated respectively at CELL 1, CELL 2 through CELL M, where M is an integer greater than or equal to one denoting the number of cells. Each of the cells 302, which can be implemented as a cell board, is communicatively coupled to other cells via an interconnect 304, such as a backplane or crossbar structure. The interconnects can be implemented as an application specific integrated circuit (ASIC).

In the example, of FIG. 8, logic analyzers 306 are implemented within the interconnects 304; namely, one logic analyzer in a first interconnect and two logic analyzers in another interconnect. Those skilled in the art will understand and appreciate that any number of one or more logic analyzers can be implemented within the interconnects 304 as well as in other circuitry, including on integrated circuits in the cells 302 or I/O subsystems 308. By way of example, each logic analyzer 306 is coupled to a bus structure (e.g., an observability bus) that can be driven with data from components within one or more cells 302. Additionally, as described herein, each logic analyzer 306 can include memory addressable within the system 300, which can be read from or written two by components on any of the associated cells 302.

By way of further example, an I/O (input/output) subsystem 308 is associated with each of the cells 302. The I/O subsystem 308 can provide an interface or pathway for accessing an associated bus structure (e.g., a PCI bus structure) or other devices coupled to the corresponding bus structure, such as through corresponding adapter (not shown). Those skilled in the art will understand and appreciate various types of I/O devices 308 that can be accessed or can access memory via the I/O subsystem 308.

Additionally, the interconnect 304 that contains one logic analyzer 306 can be coupled to the other interconnect, which contains two logic analyzers, for accessing another cell-based architecture that includes one or more other cells (not shown). The other cell-based architecture can be similarly configured to that shown and described in FIG. 8. Those skilled in the art will understand and appreciate that the system 300, however, can be implemented with any number of cells, with any number of one or more logic analyzers being implemented.

For purposes of brevity, the internal contents are shown only for CELL 1, although those skilled in the art will understand and appreciate that each of the other respective cells 302 can be implemented in a similar manner. Alternatively, different configurations could also be implemented relative to the different cells 302.

Turning to the contents of CELL 1, CELL 1 includes a cell controller 310 coupled to a cell memory subsystem 312 through an associated buffer network 314. The buffer network 314 can include a queue (e.g., an input queue and an output queue) to provide intelligent buffering of requests and responses between the memory subsystem 312 and controller 310. One or more central processing units (CPUs) 316 are also connected to the controller 310 for accessing the memory subsystem 312. Each of the CPUs 316 can include an associated cache (not shown) for storing data for local access by the CPU without requiring access to the memory subsystem 312. In the arrangement shown in FIG. 8, the CPUs 316 and the I/O subsystem 306 each can be considered memory accessing devices operative to access data in the memory subsystem 312 via the controller 310. The controller 310 can include firmware, a configuration and status register (CSR) and an ordered access queue for accessing the data in the memory subsystem 312. The memory subsystem 312 can include any number of one or more memory modules, including one or more DIMM or SIMM memory devices.

When data is accessed by CPUs 316 and/or the I/O subsystem 306, the controller or other structures can drive selected portions or all of such data to the observability bus that is associated with one or more of the logic analyzers 306. The logic analyzers 306 can, in turn, monitor the data on the associated observability bus, qualify data based on the monitoring and capture data based on the qualification of the data.

The logic analyzer further can implement a state machine that includes one or more conditions that control state transitions and how a given data capture session proceeds, such as described herein. It will be further appreciated that a data capture session for one or more of the logic analyzers 306 can be initiated and controlled programmatically by computer executable instructions running in one or more of the CPUs 316. Alternatively or additionally, a capture session can be initiated and controlled by a utility or a diagnostic tool. The utility or diagnostic tools, for example, can be run internally within a CPU 316 or externally as part of one of the I/O subsystems 308. Those skilled in the art will understand and appreciate various implementations of logic analyzers that can be employed in the computer system 300 based on the teachings contained herein.

Figure 9:
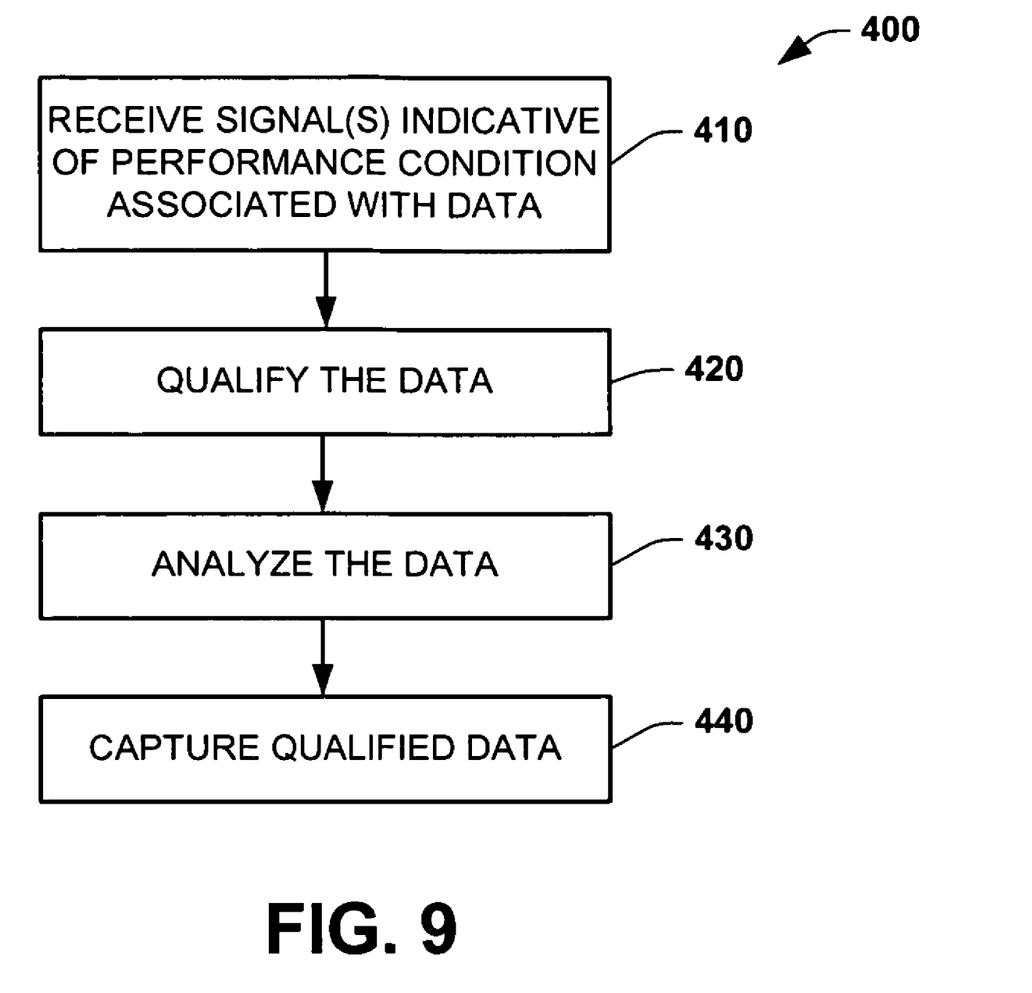
FIG. 9 is a flow diagram depicting an embodiment of a method for qualifying data capture.

In view of the foregoing structural and functional features described above, certain method will be better appreciated with reference to FIG. 9. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., logic gates, such as including transistors, a digital signal processor, or application specific integrated circuit), software (e.g., as executable instructions running on one or more processors), or any combination of hardware and software.

FIG. 9 depicts an example of a method 400. The method 400 includes receiving at least one signal indicative of at least one performance condition associated with corresponding data on a bus, as shown at 410. The at least one signal is variable over a plurality of cycles in a capture session according to the corresponding data. At 420, the corresponding data is qualified for capture from the bus based on the at least one received signal. At 430, the corresponding data on the bus is analyzed based on the at least one signal and a trigger signal is generated based on the analysis of the corresponding data on the bus, the capture session varying based at least in part on trigger signal. At 440, qualified data is captured from the bus for the capture session.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, any number of one or more logic analysis systems can be implemented in a given ASIC and any number of such ASICs can be integrated into a computer system. Accordingly, the present invention is intended to embrace all such alterations, modifications, and variations that fall within the spirit and scope of the appended claims.

What is claimed is:

1. An apparatus comprising:
 a qualification system to qualify data on an associated bus for capture and to provide a qualification signal as a function of at least one signal that describes a characteristic of the data on the associated bus;
 a data capture system to store qualified data from the associated bus in response to receiving the qualification signal and a single trigger signal at the data capture system, the trigger signal defining a capture session; and
 an analysis system including a programmable state machine to transition to different states according to monitored conditions on the associated bus, wherein the analysis system is configured to output the trigger signal, wherein the programmable state machine has three or more states; and wherein the analysis system is programmable to provide different behaviors based on programming received at an input of the analysis system, wherein the analysis system being programmed to provide different behaviors causes the programmable state machine to transition differently among the three or more states of the state machine in response to monitored conditions on the associated bus.

2. The apparatus of claim 1, wherein the qualification system is programmable to implement at least one of an arithmetic function and a Boolean function on the at least one signal.

3. The apparatus of claim 2, further comprising memory that stores logic data that defines the at least one of an arithmetic function and a Boolean function to be implemented by the qualification system.

4. The apparatus of claim 1, wherein the at least one signal comprises a plurality of signals that represent respective performance conditions for the data on the associated bus, the qualification system further comprising a plurality of subcircuits, each of the subcircuits to qualify at least a portion of the plurality of signals by performing a respective operation on the respective at least a portion of the plurality of signals.

5. The apparatus of claim 4, wherein at least one of the plurality of signals is provided to more than one of the plurality of subcircuits concurrently for qualification of the data on the associated bus.

6. The apparatus of claim 4, wherein each of the plurality of subcircuits is to perform a Boolean function by matching predefined data that is associated with each of the respective plurality of subcircuits with data represented by the at least a portion of the plurality of signals.

7. The apparatus of claim 4, wherein each of the plurality of signals defines a respective variable, the plurality of subcircuits to perform at least one Boolean function on the respective variables, the qualification signal varying as a function of the Boolean function performed by the plurality of subcircuits on the respective variables.

8. The apparatus of claim 7, further comprising system addressable memory to store logic data that defines the at least one Boolean function performed by the plurality of subcircuits on the respective variables.

9. The apparatus of claim 8, wherein the memory further comprises enable data to selectively enable each of the plurality of subcircuits.

10. The apparatus of claim 1, wherein the analysis system is to output the trigger signal as a function of the at least one signal independently of the qualification signal, and wherein the monitored conditions on the associated bus are represented by the at least one signal.

11. An integrated logic analysis system comprising:
a monitoring system to provide a plurality of signals, each of the plurality of signals having a value that varies as a function of performance of corresponding data provided on a bus in a computer system;
a qualification system to qualify the data on the bus for data capture as a function of at least some of the plurality of signals, the qualification system to generate a qualification signal to indicate that the data has been qualified;
an analysis system operative to perform logic analysis and to provide a single trigger signal as a function of the plurality of signals, the trigger signal defining a capture session, wherein the analysis system has a programmable state machine that transitions to different states according to the plurality of signals, wherein the programmable state machine has three or more states; and
a data capture system operative to store the data from the bus for the capture session in response to receiving the qualification signal indicating that the data has been qualified by the qualification system and the trigger signal at the data capture system, wherein the analysis system is programmable to provide different behaviors based on programming received at an input of the analysis system, wherein the analysis system being programmed to provide different behaviors causes the programmable state machine to transition differently among the three or more states of the state machine according to the plurality of signals.

12. The system of claim 11, wherein the qualification system is programmable to implement at least one of an arithmetic function and a Boolean function on the plurality of signals.

13. The system of claim 11, wherein the qualification system further comprising a plurality of subcircuits, each of the plurality of subcircuits to qualify at least a portion of the plurality of signals by performing a respective operation on the at least a portion of the plurality of signals.

14. The system of claim 13, wherein at least one of the plurality of signals is provided to more than one of the plurality of subcircuits concurrently.

15. The system of claim 14, wherein each of the plurality of signals defines a respective variable, the plurality of subcircuits to perform at least one Boolean function on the respective variables to qualify data on the bus according to matching predefined qualification data with the respective variables defined by the plurality of signals.

16. The system of claim 15, further comprising memory to store the predefined qualification data.

17. The system of claim 16, wherein the memory is to further store enable data to selectively enable each of the plurality of subcircuits.

18. The system of claim 11, further comprising a trigger delay system to provide a trigger delay signal based on the trigger signal and the qualification signal, the data capture system to capture data from the bus over a set of qualified stores for the capture session, the capture session being defined by the trigger delay signal.

19. The system of claim 18, wherein the analysis system is to provide the trigger signal based on the plurality of signals and as a function of a current state of the programmable state machine, the trigger delay signal varying as a function of the trigger signal.

20. The system of claim 11, wherein the monitoring system comprises a plurality of performance monitoring and counter systems, each of the plurality of performance monitoring and counter systems to monitor a number of occurrences of a respective performance condition associated with at least some data provided on the bus and to provide a corresponding condition signal as a function of the data on the bus, the respective condition signals being aggregated to form the plurality of signals.

21. A computer system comprising at least one logic analysis system according to claim 11.

22. A method comprising:
receiving at least one signal indicative of at least one performance condition associated with corresponding data on a bus, the at least one signal being variable over a plurality of cycles in a capture session according to the corresponding data;

qualifying the corresponding data for capture from the bus based on the at least one received signal by generating a qualification signal that designates qualified data;

analyzing, using an analysis system, the corresponding data on the bus based on the at least one signal and generating a single trigger signal based on the analysis of the corresponding data on the bus, wherein the analysis system includes a programmable state machine that transitions among three or more states according to monitored conditions on the bus, wherein the trigger signal is asserted based on the transitioning among the states;

capturing the qualified data from the bus for the capture session in response to the qualification signal and the trigger signal being received at a data capture system; and programming the programmable state machine to provide different behaviors, wherein the programmable state machine being programmed to provide different behaviors causes the programmable state machine to transition differently among the three or more states of the state machine in response to monitored conditions on the bus.

23. The method of claim 22, wherein the at least one received signal comprises a plurality of received signals, each of the plurality of received signals providing an indication of performance associated with selected portions of the corresponding data on the bus, the method further comprising programming logic data to define at least one of an arithmetic function and a Boolean function to be implemented relative to the plurality of received signals to qualify the corresponding data for capture from the bus.

24. The method of claim 23, further comprising selectively enabling the at least one of an arithmetic and a Boolean function.

25. The method of claim 23, wherein a plurality of subcircuits collectively perform the at least one of an arithmetic function and a Boolean function relative to the plurality of received signals, at least one of the received signals being received by at least two of the subcircuits.

26. The method of claim 22, wherein at least one monitored condition is associated with each of the plurality of states, the analyzing further comprises applying the at least one monitored condition relative to the at least one received signal according to a current state and transitioning to next state based on the application of the at least one monitored condition, the trigger signal being provided as a function of the current state transitioning to a final state.

27. The method of claim 22, further comprising programming a value that controls the data capture session relative to the trigger signal.

* * * * *